United States Patent [19]
Dixon

[11] 3,921,822
[45] Nov. 25, 1975

[54] MACHINE FOR PICKING UP, TRANSFERRING AND PLACING PARTS

[75] Inventor: Paul H. Dixon, Belvidere, Ill.

[73] Assignee: Babette Dixon as Trustee of a trust identified as Paul H. Dixon Trust dated Jan. 28, 1975, Rockford, Ill.

[22] Filed: Apr. 26, 1974

[21] Appl. No.: 464,627

[52] U.S. Cl. ............. 214/1 BB; 198/20 R; 214/1 Q
[51] Int. Cl.² ............................................ B65G 47/52
[58] Field of Search ...... 214/1 BB, 1 BT, 1 B, 1 BS, 214/1 Q; 198/19, 20 R, 22; 29/211 R, 240

[56] References Cited
UNITED STATES PATENTS

| | | | |
|---|---|---|---|
| 1,733,547 | 10/1929 | Lorenz | 214/1 BB |
| 3,658,190 | 4/1972 | Fournier | 214/1 BB |
| 3,675,302 | 7/1972 | Dixon | 29/240 X |

*Primary Examiner*—Frank E. Werner
*Attorney, Agent, or Firm*—Wolfe, Hubbard, Leydig, Voit & Osann, Ltd.

[57] ABSTRACT

A pick and place machine having jaws which pick up a part at a loading station and shift first horizontally and then vertically to place the part at a delivery station prior to releasing the part. By making a simple modification, the machine may be adapted to cause the jaws to move first vertically and then horizontally after picking up the part. In addition, the machine may be adapted to turn the part end over end during its transfer between the stations.

15 Claims, 12 Drawing Figures

MACHINE FOR PICKING UP, TRANSFERRING AND PLACING PARTS

BACKGROUND OF THE INVENTION

This invention relates to a machine having a mechanism for transferring a part from one station to another. More particularly, the invention relates to a transfer mechanism of the same general type as disclosed in my U.S. Pat. No. 3,675,302.

Such a mechanism includes a pair of opposed part-holding jaws adapted to move between closed and open positions to grip and release a part. The jaws are mounted on a carriage and are adapted to shift between loading and delivery stations when the carriage is moved back and forth on a main support. The arrangement for actuating the jaws and the carriage is extremely simple and is such that the jaws cannot shift from the loading station to the delivery station until they first close upon and pick up a part at the loading station. In addition, the jaws cannot shift back from the delivery station to the loading station until they have opened and released the part at the delivery station.

SUMMARY OF THE INVENTION

The general aim of the present invention is to provide a new and more versatile machine of the above character which may be more easily adapted to cause the jaws to move between the stations along paths of different configurations and lengths.

Another important object of the invention is to provide such a machine in which the jaws may be shifted with a pick and place movement, that is, the jaws move along one path after picking up the part and then move along a generally right angular path to place the part at a particular location with a positive motion.

Another object is to provide a machine in which the jaws may be easily adapted to either pick up a part at a given station or to release the part at that station.

Still a further object is to provide a machine whose jaws may be automatically turned during the transfer in order to re-orient the part as it travels between the loading and delivery stations.

The invention further resides in the comparatively simple construction of the transfer mechanism and in the unique mounting of the transfer mechanism on the main support.

These and other objects and advantages of the invention will become more apparent from the following detailed description when taken in conjunction with the accompanying drawings.

BRIEF DESCRIPTION OF THE DRAWINGS

FIG. 8 is a view generally similar to FIG. 6 but on a reduced scale and showing a modified machine incorporating the features of the invention.

DETAILED DESCRIPTION OF THE PREFERRED EMBODIMENTS

Figures 1, 2:
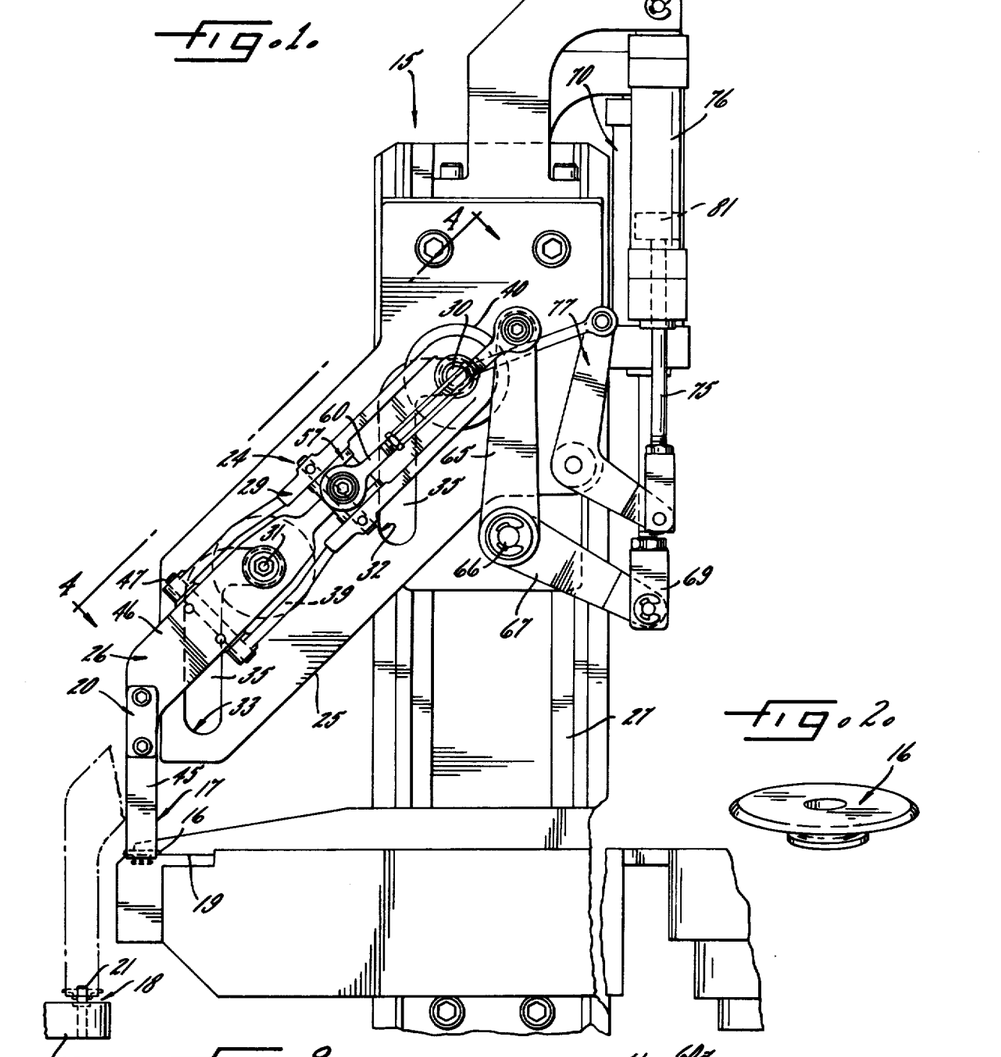
FIG. 1 is a fragmentary side elevation of one embodiment of a new and improved parts handling machine incorporating the novel features of the present invention.
FIG. 2 is a perspective view of an exemplary part adapted to be handled by the machine.
Figure 3:
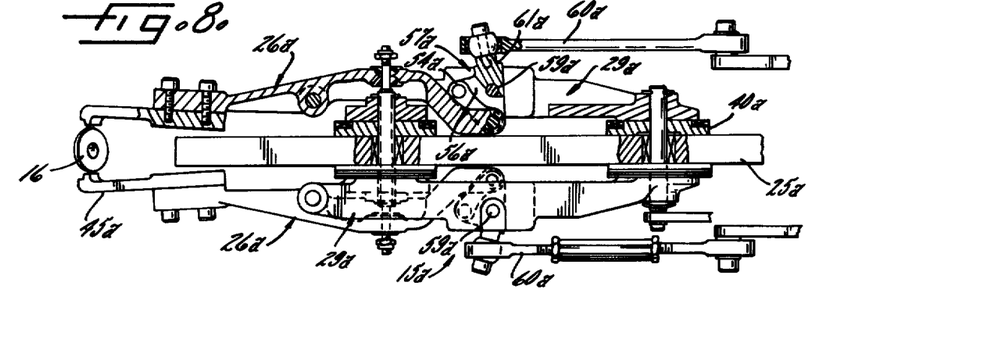
FIG. 3 is a view similar to FIG. 1 but shows parts of the machine in moved positions.

As shown in the drawings for purposes of illustration, the invention is embodied in a parts handling machine 15 for transferring parts 16 one at a time from a station 17 (hereinafter called the loading station) to a station 18 (hereinafter called the delivery station) which, in this instance, is spaced outwardly and downwardly from the loading station. The exemplary parts 16 (FIG. 2) are in the form of washers having flanged upper ends adapted to hang from a slotted track 19 along which the washers are conveyed in single file relation until each washer reaches the outer end of the track where the loading station 17 is located. Each washer 16 arriving at the loading station is picked up by a transfer mechanism 20 as shown in FIG. 1 and is shifted outwardly and downwardly to the delivery station 18 as shown in FIG. 3. Herein, the washer which is transferred to the delivery station is telescoped downwardly over and assembled to another part in the form of a pin 21 carried by an index table 23 which is rotated intermittently so as to place a new pin in the delivery station prior to the arrival of the next washer. During the time the transfer mechanism is located out of the loading station, a spring-loaded detent (not shown) prevents the washers from escaping from the end of the track 19.

The transfer mechanism 20 comprises a carriage 24 adapted to shift back and forth on a main support 25 and carrying a pair of opposed jaws 26 which are adapted to be moved between closed and open positions to grip and release the washers 16. After the jaws have been closed at the loading station 17 to grip the washer at the end of the track 19 (FIG. 1), the carriage 24 is shifted outwardly and downwardly to move the jaws and the gripped washer to the delivery station 18 (FIG. 3). Upon arrival at the delivery station, the jaws are opened to release the washer and thereafter the carriage is shifted upwardly and inwardly to return the empty jaws to the loading station where the jaws close upon and pick up the next washer. Like in my aforementioned patent, the carriage and jaws are actuated in such a manner that the jaws cannot be shifted out of the loading station until they have gripped the washer to be transferred and, by the same token, the jaws cannot be returned from the delivery station until they have moved to their open positions and released the transferred washer. Such an arrangement assures that the jaws will be loaded with a washer on each active stroke and further assures that the jaws will fully release the gripped washer before beginning their return stroke.

In accordance with one aspect of the present invention, the carriage 24 and the support 25 are uniquely constructed so as to enable the path followed by the jaws 26 in moving between the stations 17 and 18 to be easily defined and to enable the machine 15 to be easily designed to cause the jaws to move through paths of various shapes and lengths as may be required to transfer parts between stations which are located differently from the stations 17 and 18. Moreover, the carriage is capable of shifting the jaws with a pick and place movement of the type in which the jaws first move along a linear path after picking up the part and then move along a right angular path to positively place the part in a specific location before releasing the part.

More specifically, the main support 25 of the present machine 15 comprises a metal plate which is disposed in a vertical plane and which extends outwardly from an upright column 27 (FIGS. 1 and 5) secured to the machine base. The carriage 24 comprises a pair of substantially identical U-shaped castings 29 (FIGS. 1, 6 and 7) disposed on opposite sides of the support plate 25 and each carrying one of the jaws 26.

In keeping with the invention, the carriage members 29 are connected together by upper and lower transversely extending guide pins 30 and 31 (FIGS. 1, 6 and 7) which extend through a pair of slots 32 and 33 formed through the plate 25, the slot 33 being spaced both outwardly and downwardly from the slot 32. Each slot is shaped as an inverted L and includes a horizontal leg 34 and a vertical leg 35 extending downwardly from the outer end of the horizontal leg. The junction between the two legs of each slot is radiused as indicated at 36 in FIG. 7.

Figures 5, 6:
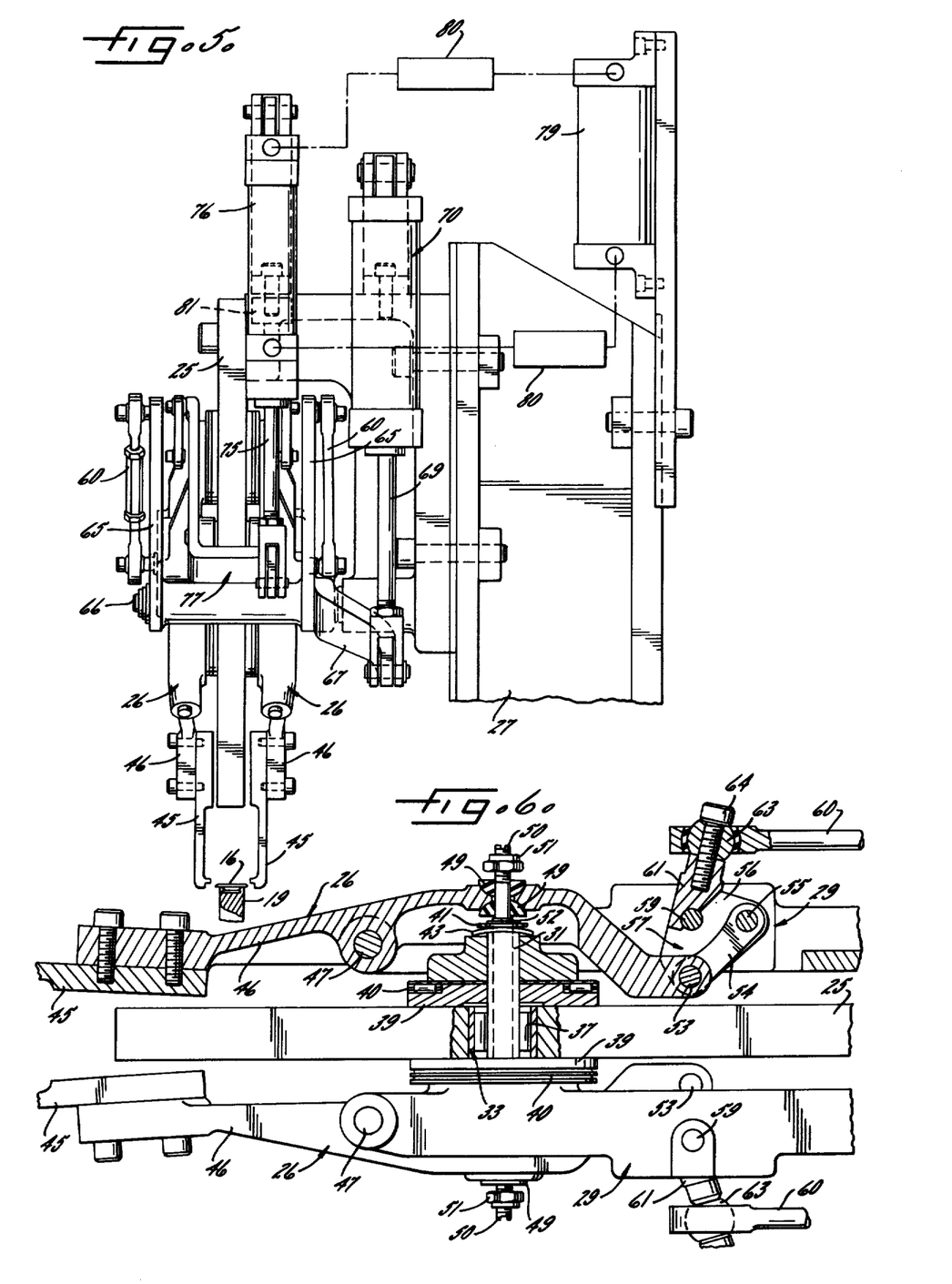
FIG. 5 is a fragmentary rear elevation of the machine shown in FIG. 1.
FIG. 6 is an enlarged view similar to FIG. 4 but showing parts in moved positions.
Figure 7:
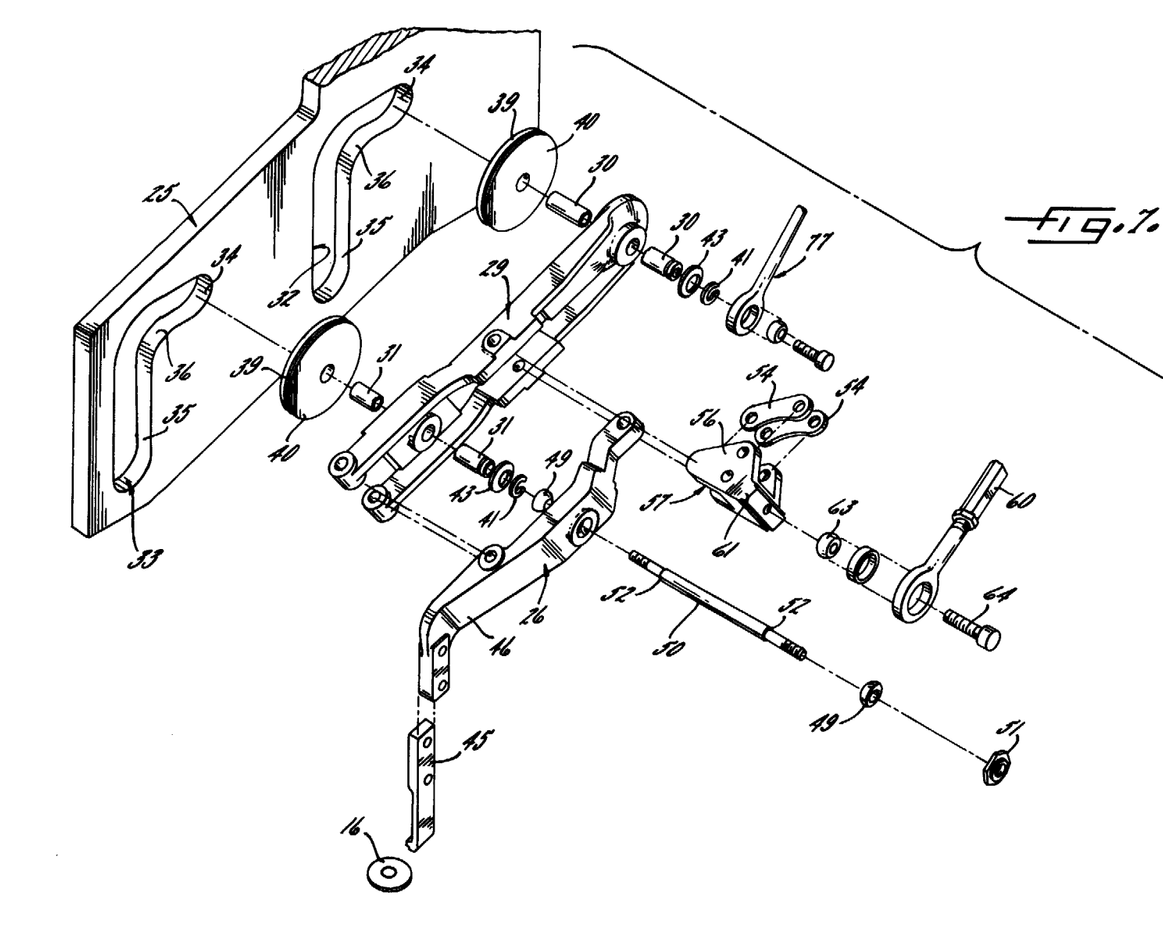
FIG. 7 is an exploded perspective view of parts of the machine shown in FIG. 1 and FIGS. 3 to 6.

A needle bearing 37 (FIG. 6) is telescoped over each pin 30, 31 and fits snugly into the slot 32, 33 to confine movement of the pins to the L-shaped path defined by the slots. Telescoped over each pin and sandwiched between the support plate 25 and each carriage member 29 are a nylon friction disc 39 and a Torrington thrust washer 40 (FIGS. 6 and 7). The various elements are held together by snap rings 41 (FIG. 6) on the outer ends of the pins 30 and 31. A bowed washer 43 is sandwiched between one of the carriage members 29 and one of the snap rings on each pin and serves to press the nylon disc 39 into frictional engagement with the plate 25 so as to retard free movement of the carriage members relative to the plate. When a downward and outward force is applied to the carriage members 29, the guide slots 32 and 33 cause the carriage 24 first to move outwardly along a horizontal path and then downwardly along a vertical path, the carriage re-tracing the same path but in a reverse direction when an upwardly and inwardly directed force is applied to the carriage. Thus, the carriage possesses the basic pick and place motion needed for first moving the washer 16 horizontally away from the track 19 and then shifting the washer vertically to place it on the pin 21.

The jaws 26 include vertically extending gripping fingers 45 (FIGS. 5 and 6) designed specifically for the washer 16 to be handled and further include outwardly and downwardly inclined mounting arms 46 to which the fingers are attached. Each mounting arm 46 is connected intermediate its ends to the lower end of one of the carriage members 29 by an outwardly and upwardly inclined pivot 47 which serves to mount the jaw for swinging between its open and closed positions. Between the pivot 47 and its upper end, each mounting arm 46 is supported by two hemispherical bushings 49 (FIGS. 6 and 7) which are slidably received on a rod 50. The latter extends slidably through the lower pin 31, which is tubular so as to accommodate the rod. The outboard bushings are captivated on the rod by stop nuts 51 while movement of the inboard bushings is limited by shoulders 52 on the rod.

As shown in FIGS. 6 and 7, the upper end of each mounting arm 26 is pivotally connected at 53 to a pair of links 54 which, in turn, are pivotally connected at 55 to an upwardly and inwardly pointing arm 56 of a clevis-type bellcrank 57. The latter is supported to turn about an axis paralleling the pivot axis 47 of the jaw 26 by a pin 59 which is anchored to the carriage member 29. As the bellcranks are turned back and forth, the links 54 cause the jaws to close and open.

In order to turn the bellcranks 57, a reversible power-actuated member in the form of a link 60 (FIGS. 1, 6 and 7) is pivotally connected to the laterally extending arm 61 of each bellcrank by a spherical bushing 63 and a screw 64. The upper end of each link 60 is similarly connected to an arm 65 (FIGS. 1 and 5) which is anchored to a rockshaft 66 journaled in the column 27. A crank arm 67 also is anchored to the rockshaft and is connected to the reciprocating rod 69 of a pneumatic actuator 70 which is supported by the column. As the rod 69 is retracted upwardly, the arms 65 are rocked counterclockwise (FIG. 1) to exert an outwardly and downwardly directed force on the links 60. Conversely, downward extension of the rod 69 causes an upwardly and inwardly directed force to be exerted on the links 60. Suitable means (not shown) are provided for controlling the actuator 70 to reverse the rod 69 at spaced intervals.

At the start of each pick and place cycle, the carriage 24 is located in its uppermost position shown in FIG. 1 so that the jaws 26 are disposed in the loading station 17 at the outer end of the track 19, the jaws are in their open positions as shown in FIG. 6, and the rod 69 of the actuator 70 is fully extended. As the rod is first retracted, the initial outward and downward motion of the links 60 causes the bellcranks 57 to turn counterclockwise (FIG. 6) about the pivot pins 59 to close the jaws. During closing of the jaws, the links 60 apply virtually no force to the carriage 24 since the outward and downward motion of the links is taken up in the turning of the bellcranks about the pivot pins. And, since motion of the carriage relative to the plate 25 is retarded by the friction discs 39, the carriage remains stationary to keep the jaws located in the loading station.

Figures 3, 4:
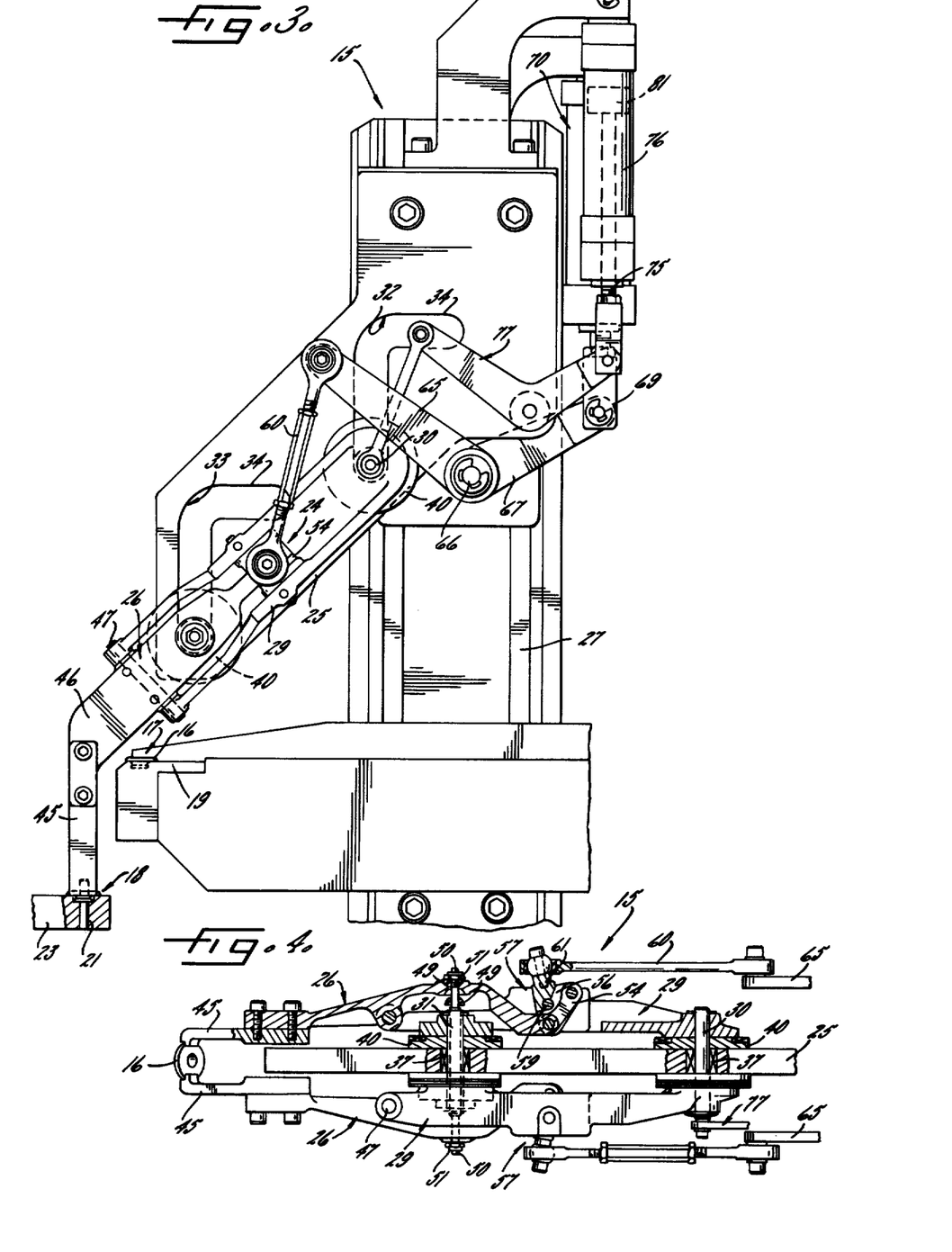
FIG. 4 is a fragmentary view of a portion of the machine as taken substantially along the line 4—4 of FIG. 1, parts of the machine being broken away and shown in section.

As the jaws 26 reach their closed positions and grip the washer 16, the outboard bushings 49 engage the stop nuts 51 and prevent any further turning of the bellcranks 57 (see FIG. 4). Further turning of the bellcranks also is prevented by virtue of the jaws being stopped by the washer 16. As a result, continued outward and downward motion of the links 60 no longer is taken up by turning of the bellcranks but instead is transmitted to the carrier members 29 through the pivot pins 59 and the rod 50. Accordingly, the frictional resistance provided by the discs 39 is overcome and the carriage 24 starts moving outwardly along a horizontal path as defined by the horizontal legs 34 of the slots 32 and 33. The jaws and the gripped washer thus are moved horizontally away from the track 19 until the bearings 37 move into the vertical legs 35 of the slots to cause the jaws to move downwardly along a vertical path and place the washer on the pin 21 in the delivery station 18 (see FIG. 3).

After the washer 16 has been placed, the rod 69 of the actuator 70 is extended downwardly to impart an upward and inward motion to the links 60. Initially, such motion is taken up by the bellcranks 57 turning clockwise (FIG. 4) on the pivot pins 59 to move the jaws 26 to their open positions and release the washer. As the jaws open, the inboard bushings 49 engage the stop shoulders 52 on the rod 50 and prevent further turning of the bellcranks. Thus, the motion imparted to the links starts acting on the carriage 24 through the pins 59 and the rod 50 so as to return the jaws to the loading station 17, the jaws shifting first upwardly and then inwardly during such return.

If the machine 15 is cycled at extremely high speeds or if the transfer mechanism 20 has a comparatively high mass, it is desirable to supplement the retarding force provided by the discs 39 so as to better insure that the carriage 24 will not move until the jaws 26 have been fully opened or closed. For this purpose, the rod 75 (FIGS. 1 and 5) of a hydraulic cylinder 76 on the column 27 is connected to the upper pin 30 by a pivoted linkage 77. The upper and lower ends of the cylinder are filled with oil and communicate with one another and a reservoir 79 (FIG. 5) by way of pressure relief valves 80, the oil acting against opposite sides of a piston 81 telescoped into the cylinder and connected to the rod 75.

When the links 60 first move outwardly and downwardly to close the jaws 26, the oil in the upper end of the cylinder 76 is trapped in the cylinder and thus prevents any movement of the carriage 24. When the links 60 subsequently act through the pins 59 and the rod 50 to exert a substantial force on the carriage, the pressure in the cylinder builds up and the upper relief valve 80 allows oil to flow out of the upper end of the cylinder and into the reservoir 79 to permit movement of the carriage. The oil in the lower end of the cylinder acts in a similar manner when the links 60 are moved upwardly and inwardly. In addition to retarding movement of the carriage during opening and closing of the jaws 24, the cylinder exerts a drag force on the carriage while it is moving and thus promotes smoother acceleration and deceleration.

From the foregoing, it will be apparent that the present invention brings to the art a comparatively simple parts handling machine 15 having the capability of moving the jaws 26 with a pick and place motion as a result of the spaced L-shaped slots 32 and 33 in the support plate 25. By changing the length, shape or orientation of the slots, the jaws can be made to follow different paths to enable the machine to be easily adapted to the particular positioning of the loading and delivery stations of different parts handling systems.

A further important advantage of the present machine 15 is that the opening and closing motion of the jaws 26 may be reversed simply by orienting the bellcranks 57 differently on the carriage members 29 when the machine is assembled. A machine 15a in which the bellcranks 57a are oriented differently from the bellcranks 57 of the machine 15 is shown in FIG. 8. As shown, the bellcranks 57a have been flipped over through 180° and are oriented on the pivot pins 59a such that the arms 56a of the bellcranks extend downwardly and outwardly from the pins 59a instead of upwardly and inwardly therefrom. The links 54a and 60a are connected to the bellcranks 57a in the same manner as is the case with the machine 15. With this arrangement, initial outward and downward motion of the links 60a causes the jaws 26a to open while initial upward and inward motion of the links causes the jaws to close. Thus, the machine 15a may pick up a part at a loading station located in the same position as the delivery station 18 of the machine 15, and may move the part upwardly and inwardly before releasing the part at a station corresponding to the loading station 17 of the machine 15. Accordingly, machines of the present invention may be easily adapted to either pick up or release a part at a given location simply by changing the positioning of the bellcranks.

The present invention further contemplates the provision of a unique machine 15' which is capable of changing the orientation of a part 16' while transferring the part from a loading station 17' to a delivery station 18'. The machine 15' is shown in FIGS. 9 to 12 in which elements corresponding to the elements of the machine 15 are indicated by the same but primed reference numerals. Herein, the part 16' is shown as being a spark plug insulator which best lends itself to delivery along the track 19' while positioned with its coned end pointing upwardly. The insulator should, however, be positioned with its coned end pointing downwardly when it is placed on and assembled to another part at the delivery station 18'.

Figures 9, 10:
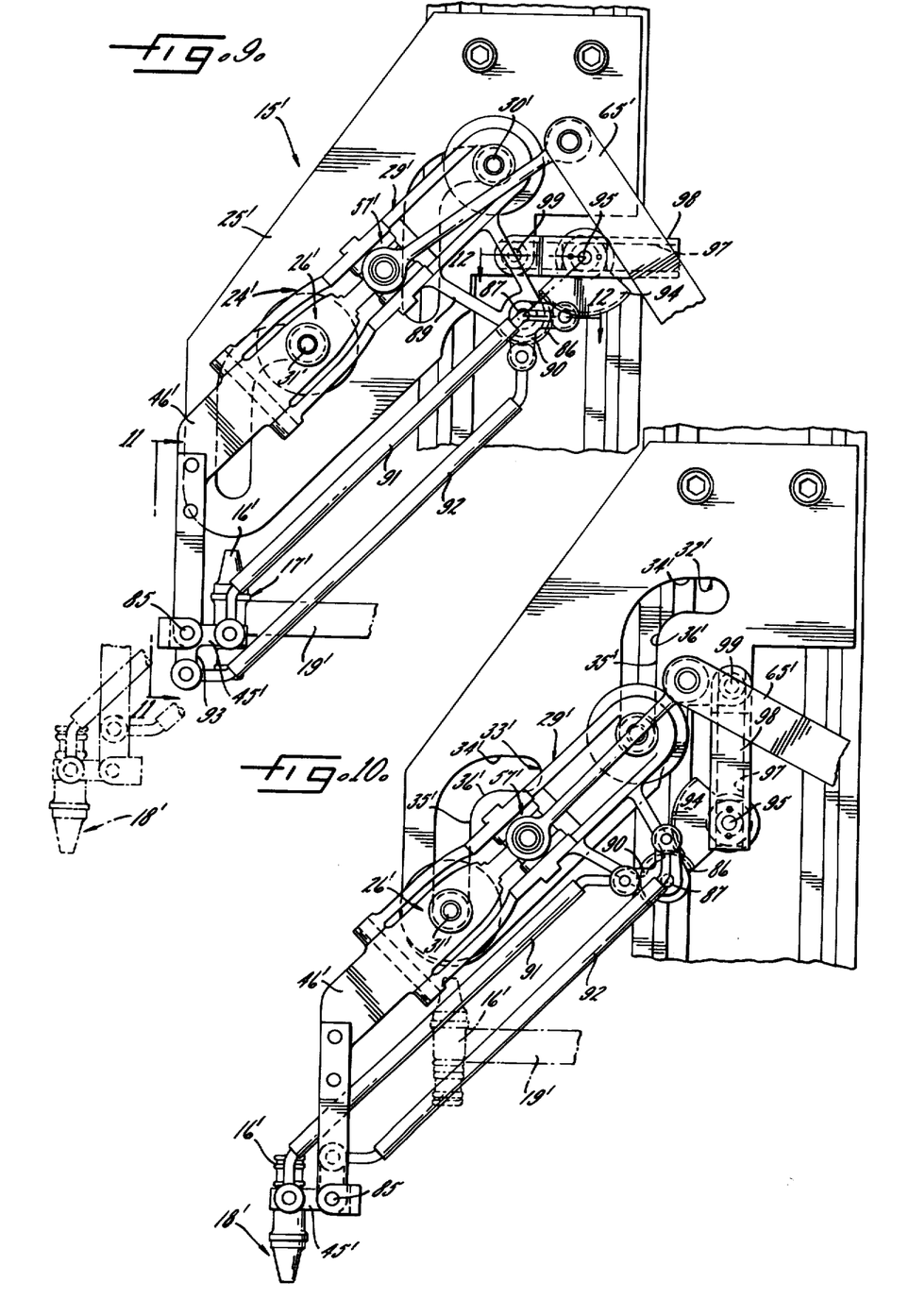
FIG. 9 is a view generally similar to FIG. 1 but shows still another embodiment of a machine incorporating the features of the invention.
FIG. 10 is a view similar to FIG. 9 but show parts of the machine of FIG. 9 in moved positions.
Figure 11:
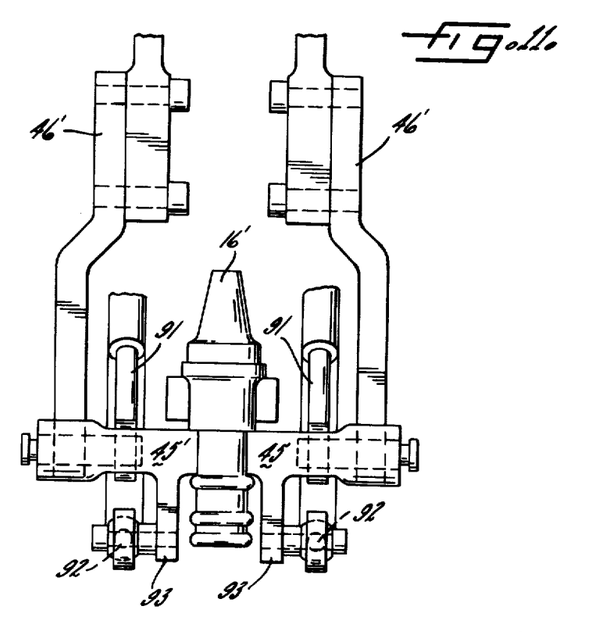
FIG. 11 is an enlarged fragmentary elevation as taken substantially along the line 11—11 of FIG. 9.
Figure 12:
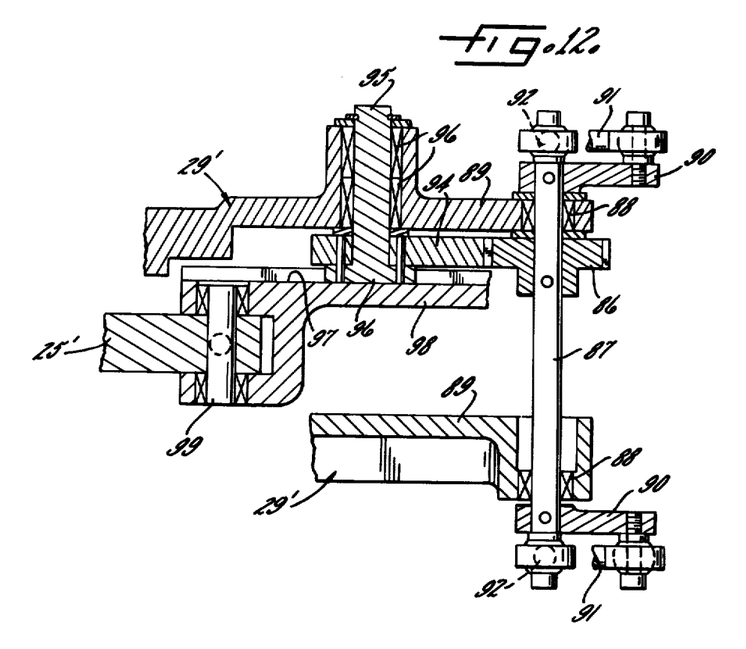
FIG. 12 is an enlarged fragmentary cross-section taken substantially along the line 12—12 of FIG. 9.

To enable the insulator 16' to be inverted, the jaw fingers 45' are connected to the jaw mounting arms 46' to turn about horizontal pivots indicated by the reference numeral 85. Turning of the jaw fingers between the positions shown in FIGS. 9 and 10 is effected as movement of the carriage 24' is changed between horizontal and vertical, that is, as the carriage pins 30' and 31' move around the radiused corners 36' of the slots 32' and 33'. For this purpose, a gear half 86 (FIGS. 9, 10 and 12) is fixed to a horizontally extending shaft 87 which is journaled in bearings 88 (FIG. 12) supported by ears 89 projecting downwardly from the carriage members 29'. An L-shaped bellcrank 90 is fixed to each end of the shaft, and the arms of each bellcrank are pivotally connected to links 91 and 92 by spherical bushings. The links 91 are connected to the jaw fingers 45' by spherical bushings while the links 92 are similarly connected to right angular projections 93 (FIGS. 9 and 11) formed integrally with and projecting from the fingers.

As the pins 30' and 31 move downwardly past the radiused corners 36' of the slots 32' and 33', the gear half 86 and the shaft 87 are turned counterclockwise (FIG. 9) and act through the links 91 and 92 to turn the jaw fingers 45' 180° from the position shown in FIG. 9 to the position shown in FIG. 10 and thus invert the insulator 16'.

Conversely, the gear half 86 is rotated clockwise as the pins 30' and 31' pass upwardly across the radiused corners 36' and such rotation serves to turn the jaw fingers reversely so as to position the fingers to pick up the next insulator on the track 19'.

In order to rotate the gear half 86, a gear quadrant 94 (FIGS. 9, 10 and 12) having twice as many teeth as the gear half meshes with the gear half and is fixed to a horizontal pin 95 rotatably journaled by bearings 96 (FIG. 12) supported by one of the carriage members 29'. The pin 95 is formed with a rectangular head 96 which is slidably received in a correspondingly shaped slot 97 formed in one side of an arm 98, the latter being pivotally mounted on a horizontal pin 99 anchored to the main support plate 25'.

When the jaw fingers 45' are positioned in the loading station 17' and are oriented as shown in full in FIG. 9, the arm 98 extends in a hoizontal direction. After the fingers 45' have closed and picked up the insulator 16' and as the carriage 24' moves along the horizontal legs 34' of the slots 32' and 33', the arm 98 remains horizontal and the head 96 of the pin 95 simply slides horizontally along the slot 97 in the arm. Accordingly, no rotation is imparted to the gear quadrant 94 and thus the jaw fingers 45' maintain their original orientation.

As the pins 30' and 31' of the carriage 24' pass across the radiused corners 36' of the slots 32' and 33', the downward movement of the carriage causes the arm 98 to pivot downwardly through 90 degrees about the pin 99 (see FIG. 10). The head 96 of the pin 95 turns with the arm 98 and thus causes the gear quadrant 94 to turn clockwise through 90 degrees so as to rotate the gear half 86 through 180°. As a result, the jaw fingers 45' are turned through 180° by the links 91 and 92 and hence the insulator 16' is inverted as movement of the carriage changes from horizontal to vertical.

The arm 98 reaches a vertical position as the pins 30' and 31 pass the corners 36' and move into the vertical legs 35' of the slots 32' and 33'. During the remaining downward movement of the carriage 24', the head 96 of the pin 95 simply slides downwardly in the slot 97 and does not rotate the gear quadrant 94. Thus, the inverted orientation of the insulator 16' is maintained as the insulator is placed in the delivery station 18'.

A similar but reverse action occurs when the carriage 24' is retracted upwardly and inwardly. That is, the arm 98 remains vertical and the jaw fingers 45' remain inverted as the carriage moves upwardly. As the pins 30' and 31' move around the corners 36', the arm 98 is pivoted upwardly through 90° to turn the gear quadrant 94 counterclockwise and return the jaw fingers to their original orientation, such orientation being maintained as the fingers travel horizontally back to the loading station 17'.

Accordingly, it will be apparent that the machine 15' is capable of inverting the part 16' automatically during the transfer and effects such inversion as movement of the carriage 24' changes from horizontal to vertical. By changing the ratio of the gears 86 and 94, the part 16' can be turned through angles other than 180 degrees if necessary to best meet the requirements of different parts handling systems.

I claim as my invention:

1. A parts handling machine comprising a support, transfer mechanism movable back and forth on said support and operable first to pick up a part at a loading station and then to move the part to and release the part at a delivery station spaced from said loading station, a pair of slots formed in said support and spaced from one another along the direction of movement of said transfer mechanism, said slots being similar in shape and defining the path of movement of said transfer mechanism, said transfer mechanism comprising a carriage having a pair of transversely extending guides spaced from one another along the direction of movement of said transfer mechanism and received within said slots to confine movement of said carriage to the path defined by said slots, a pair of opposed part holding jaws mounted on said carriage to move back and forth with the carriage between said loading and delivery stations and to move relative to the carriage between open and closed positions, and actuator means connected to said jaws and operable when the jaws are in each station to move the jaws relative to said carriage until the jaws stop upon reaching one of said positions and thereafter being operable to move said carriage on said support so as to move the jaws from one station to the other.

2. A parts handling machine as defined in claim 1 in which each of said slots is generally L-shaped whereby said jaws follow an L-shaped path in moving between said stations.

3. A parts handling machine as defined in claim 1 in which said carriage comprises a pair of transversely spaced members disposed on opposite sides of said support, said guides including means extending through said slots and connecting said carriage members together for movement in unison.

4. A parts handling machine as defined in claim 3 further including means located between said support and each of said carriage members for frictionally retarding movement of said carriage members relative to said support.

5. A parts handling machine as defined in claim 1 further including a cylinder on said support, a piston telescoped into said cylinder and movable relative to the cylinder in response to back and forth movement of said carriage, and pressure fluid within each end of said cylinder and acting against said piston for retarding movement of said carriage relative to said support.

6. A parts handling machine as defined in claim 1 in which each of said jaws is pivotally mounted on said carriage to move between its open and closed positions, a bellcrank associated with each jaw and mounted on said carriage to turn about a pivot paralleling the pivot axis of the jaw, a link pivotally connected between each jaw and one arm of the associated bellcrank, said actuating means comprising a reversible power-actuated member connected to the other arm of each bellcrank, said member being operable when actuated in one direction to turn said bellcrank about said pivot and move the associated jaw to one of its positions prior to moving the jaw between said stations, and being operable when actuated in the opposite direction to turn said bellcrank in the opposite direction about said pivot to move the associated jaw to the other of its positions prior to moving the jaw reversely between said stations.

7. A pick and place machine comprising a support, transfer mechanism movable back and forth on said support and operable first to pick up a part at a loading station and then to place the part in and release the part at a delivery station spaced horizontally and vertically from said loading station, a pair of substantially L-shaped slots formed in said support, said slots being similarly oriented with one leg of each slot extending vertically, said slots being spaced horizontally and vertically from each other and defining the path of movement of said transfer mechanism, said transfer mechanism comprising a carriage having a pair of transversely extending guides spaced horizontally and vertically from each other and received within said slots to confine movement of the carriage to the path defined by the slots, a pair of opposed part holding jaws mounted on said carriage to move back and forth with the carriage between said loading and delivery stations and to move relative to the carriage between open and closed positions, and actuator means connected to said jaws and operable when the jaws are in each station to move the jaws relative to said carriage until the jaws stop upon reaching one of said positions and thereafter being operable to move said carriage on said support so as to move the jaws from one station to the other.

8. A pick and place machine as defined in claim 7 in which each of said jaws is pivotally mounted on said carriage to move between its open and closed positions, a bellcrank associated with each jaw and mounted on said carriage to turn about a pivot paralleling the pivot axis of the jaw, a link pivotally connected between each jaw and one arm of the associated bellcrank, said actuating means comprising a reversible power-actuated member connected to the other arm of each bellcrank, said member being operable when actuated in one direction to turn said bellcrank in one direction about its pivot and move the associated jaw to one of its positions prior to moving the jaw downwardly between said stations, and being operable when actuated in the opposite direction to turn said bellcrank in the opposite direction about its pivot to move the associated jaw to the other of its positions prior to moving the jaw upwardly between said stations.

9. A pick and place machine as defined in claim 8 in which each bellcrank is positioned on its pivot with said one arm oriented so as to cause pivoting of the associated jaw to its closed position when said member is actuated in said one direction to move said jaw downwardly.

10. A pick and place machine as defined in claim 8 in which each bellcrank is positioned on its pivot with said one arm oriented so as to cause pivoting of the associated jaw to its open position when said member is actuated in said one direction to move said jaw downwardly.

11. A parts handling machine comprising a support, transfer mechanism movable back and forth on said support and operable first to pick up a part at a loading station and then to move the part to and release the part at a delivery station spaced horizontally and vertically from said loading station, said transfer mechanism comprising a carriage mounted on said support for back and forth movement, a pair of opposed part holding jaws mounted on said carriage to move back and forth with the carriage between said loading and delivery stations and to pivot relative to the carriage between open and closed positions, a bellcrank associated with each jaw and mounted on said carriage to turn about a pivot paralleling the pivot axis of the jaw, a link pivotally connected between each jaw and one arm of the associated bellcrank, and a reversible power-actuated member connected to the other arm of each bellcrank and operable when the jaw is in each station to move the jaw relative to the carriage until the jaw stops upon reaching one of its positions and thereafter being operable to move said carriage on said support so as to move the jaw from one station to the other.

12. A parts handling machine as defined in claim 11 in which said member is operable when actuated in one direction to turn said bellcrank in one direction about its pivot and move the associated jaw to one of its positions prior to moving the jaw downwardly between said stations, and said member being operable when actuated in the opposite direction to turn said bellcrank in the opposite direction about its pivot to move the associated jaw to the other of its positions prior to moving the jaw upwardly between said stations.

13. A parts handling machine as defined in claim 12 in which said bellcrank is positioned on said pivot with said one arm oriented so as to cause pivoting of the associated jaw to its closed position when said member is actuated in said one direction to move said jaw downwardly.

14. A parts handling machine as defined in claim 12 in which said bellcrank is positioned on said pivot with said one arm oriented so as to cause pivoting of the associated jaw to its open position when said member is actuated in said one direction to move said jaw downwardly.

15. A parts handling machine as defined in claim 12 in which the pivot axes of each jaw and each bellcrank are fixed relative to said carriage, each bellcrank being capable of being connected between said power-actuated member and said link when said bellcrank is oriented in a first position with said one arm extending in one direction and also when oriented in a second position with said one arm extending in the opposite direction.

* * * * *